US012790161B2

(12) United States Patent
Rhee

(10) Patent No.: US 12,790,161 B2
(45) Date of Patent: Nov. 10, 2026

(54) ZIGZAG STACKING DEVICE

(71) Applicant: LG Energy Solution, Ltd., Seoul (KR)

(72) Inventor: Jung Han Rhee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 539 days.

(21) Appl. No.: 18/283,966

(22) PCT Filed: Nov. 17, 2022

(86) PCT No.: PCT/KR2022/018222
§ 371 (c)(1),
(2) Date: Sep. 25, 2023

(87) PCT Pub. No.: WO2023/101279
PCT Pub. Date: Jun. 8, 2023

(65) Prior Publication Data

US 2024/0051782 A1 Feb. 15, 2024

(30) Foreign Application Priority Data

Dec. 3, 2021 (KR) ........................ 10-2021-0172302

(51) Int. Cl.
*H01M 10/04* (2006.01)
*B65H 45/101* (2006.01)

(52) U.S. Cl.
CPC ...... *B65H 45/101* (2013.01); *H01M 10/0459* (2013.01)

(58) Field of Classification Search
CPC ............. B65H 45/101; B65H 2801/72; H01M 10/0459; H01M 10/0404; H01M 10/0583; H01M 10/04; Y02E 60/10; Y02P 70/50
See application file for complete search history.

(56) References Cited

U.S. PATENT DOCUMENTS

2009/0165936 A1* 7/2009 Sakata .............. H01M 10/0431 156/227
2015/0180082 A1* 6/2015 Jung .................. H01M 10/052 429/246

(Continued)

FOREIGN PATENT DOCUMENTS

JP H03230479 A 10/1991
JP 2019186229 A 10/2019

(Continued)

OTHER PUBLICATIONS

Extended European Search Report for Application No. 22901637.3, dated May 23, 2025. 7 pgs.

(Continued)

*Primary Examiner* — Christian Roldan
(74) *Attorney, Agent, or Firm* — Lerner David LLP

(57) ABSTRACT

A zigzag stacking device includes a stack table, swing roll, oppositely disposed positive and negative electrode unwinders, sealer, and controller. Positive and negative electrode plates and a separator are stacked on the stack table. The swing roll supplies the separator in a zigzag shape to the stack table by horizontal movement. The positive electrode unwinder supplies the positive electrode plate to a folded section of the separator folded in a zigzag shape. The negative electrode unwinder alternately supplies the negative electrode plate to a folded section adjacent to the folded section of the separator to which the positive electrode plate is supplied. The sealer presses and seals the separator when the separator is on the stack table. The controller controls operations of the stack table and sealer to seal the separator whenever the separator is stacked on the positive electrode plate and over the stack table.

12 Claims, 13 Drawing Sheets

(56) References Cited

U.S. PATENT DOCUMENTS

| | | | | |
|---|---|---|---|---|
| 2015/0333361 | A1 * | 11/2015 | Sato | H01M 10/0583 29/730 |
| 2020/0235434 | A1 | 7/2020 | Lee et al. | |

FOREIGN PATENT DOCUMENTS

| | | | | |
|---|---|---|---|---|
| KR | 20140103083 | A | 8/2014 | |
| KR | 20150051498 | A | 5/2015 | |
| KR | 101531234 | B1 | 6/2015 | |
| KR | 20160133041 | A | 11/2016 | |
| KR | 20180128770 | A | 12/2018 | |
| KR | 20190054491 | A | 5/2019 | |
| KR | 102049516 | B1 | 11/2019 | |
| KR | 20200023852 | A | 3/2020 | |
| KR | 20200023853 | A | 3/2020 | |
| KR | 20200023854 | A | 3/2020 | |
| KR | 20200125024 | A | 11/2020 | |
| KR | 20200134513 | A | 12/2020 | |
| KR | 20210015282 | A | 2/2021 | |
| KR | 102303834 | B1 * | 9/2021 | H01M 10/0459 |

OTHER PUBLICATIONS

International Search Report for PCT/KR2022/018222 mailed Mar. 8, 2023. 3 pages.

* cited by examiner

ZIGZAG STACKING DEVICE

CROSS-REFERENCE TO RELATED APPLICATIONS

The present application is a national phase entry under 35 U.S.C. § 371 of International Application No. PCT/KR2022/018222 filed on Nov. 17, 2022, and published as International Publication No. WO 2023/101279 A1, which claims priority from Korean Patent Application No. 10-2021-0172302, filed on Dec. 3, 2021, all of which are hereby incorporated herein by reference in their entireties.

FIELD

The present invention relates to a zigzag stacking device.

More particularly, the present invention relates to a zigzag stacking device for preventing an electrode from moving between separators during a zigzag stacking process of the electrode.

Further, the present invention relates to a zigzag stacking device which can stably align a positive electrode plate in a stacked electrode assembly by performing a sealing process together whenever a separator is stacked on the positive electrode plate in a stacking process.

BACKGROUND

In recent years, secondary batteries which can be charged and discharged have been widely used as energy sources for wireless mobile devices.

Further, the secondary batteries have been spotlighted as energy sources of not only portable devices such as mobile phones, laptops, and camcorders but also electric vehicles and hybrid electric vehicles that are alternatives for solving air pollution caused by existing gasoline vehicles and existing diesel vehicles using fossil fuels.

Thus, the types of applications using the secondary batteries have been very diversified due to the advantages of secondary batteries, and in the future, it is expected that secondary batteries will be applied to more fields and more products than now.

These secondary batteries are classified into lithium ion batteries, lithium ion polymer batteries, lithium polymer batteries, and the like according to configurations of electrodes and electrolytes, and use of lithium ion polymer batteries, which are less likely to leak electrolytes and are easily manufactured, is increasing.

In general, secondary batteries are classified into cylindrical batteries and prismatic batteries in which electrode assemblies are embedded in a cylindrical metallic can and a prismatic metallic can and pouch-type batteries in which the electrode assembly is embedded in an aluminum laminate sheet pouch-type case, according to a shape of a battery case.

Further, the electrode assembly embedded in the battery case is a power generating element having a structure including a positive electrode, a negative electrode, and a separator interposed between the positive electrode and the negative electrode and can be charged and discharged and is classified into a jelly roll-type electrode assembly wound with a separator interposed between a long sheet-type positive electrode and a long sheet-type negative electrode coated with an active material and a stack-type electrode assembly in which a plurality of positive electrodes and a plurality of negative electrodes having a predetermined size are sequentially stacked with a separator interposed therebetween.

Here, since the electric vehicles and the like use high-output electric energy, a plurality of battery modules are required, and a plurality of battery cells are connected in series or parallel inside the battery module.

Meanwhile, when the battery cell is manufactured, a stacking process is performed by sequentially stacking a positive electrode plate, the separator, and a negative electrode plate.

Here, the stacking process is classified into a winding method, a stacking and folding method, and a zigzag stacking method.

The winding method is a method of manufacturing a battery cell by rolling one cell and inserting the rolled one cell into a cylindrical case, and the stacking and folding method is a method of manufacturing a battery cell by rolling a positive electrode material, a separator, and a negative electrode material in a jelly roll type and inserting the rolled positive electrode material, the rolled separator, and the rolled negative electrode material into a cylindrical housing or a prismatic housing.

Further, the zigzag stacking method is a method of manufacturing a battery cell by stacking a positive electrode plate, a separator, and a negative electrode plate and is a method in which the separators are stacked on a zigzag shape without cutting and the negative electrode plate and the positive electrode plate are alternately stacked therebetween. Thus, durability is improved by folding only the separators without folding the positive electrode plate and the negative electrode plate.

As illustrated in FIGS. 1 and 2, in the zigzag stacking method as described above, a separator 121 wound around a separator unwinder 103 is supplied to a swing roll 120 through a first dancer roll 104 and a feeding roll 105, a buffer roll 106 and a second dancer roll 107, and a supply roll 108, and the separator 121 is stacked on a stack table 110 in a zigzag shape by left-right movement of the swing roll 120.

In this way, a positive electrode plate 131 and a negative electrode plate 141 are alternately stacked on the separator 121 folded in a zigzag shape on a stacking device 100 to form an electrode assembly. After the stacking process is completed, an electrode binder is applied, and the entire wide surface is pressed and bonded with a hot press 201.

Here, the positive electrode plate and the negative electrode plate supplied to the separator folded in a zigzag shape are cut by a cutter, and the cut positive electrode plate and the cut negative electrode plate are sequentially and repeatedly stacked on a separator folded section and an adjacent folded section adjacent to the folded section.

In general, the positive electrode plate is smaller than the negative electrode plate. Thus, when the positive electrode plate and the negative electrode plate are stacked on the separator folded section, movement between the positive electrode plate and the separator occurs due to sliding during a subsequent stacking process, and accordingly, defects occur in the stacked electrode assembly due to misalignment of the positive electrode plate.

Thus, there is a demand for an improved stacking device which can prevent misalignment due to movement of the positive electrode plate stacked on the separator folded section when the electrode plates are stacked on a zigzag shape, and thus improve product quality.

RELATED ART DOCUMENT (Patent document 1) Korean Patent Registration No. 10-1531234.

SUMMARY OF THE DISCLOSURE

An objective of the present invention is to provide a zigzag stacking device which can prevent an electrode from moving between separators during a stacking process for the electrode, which is performed in a zigzag shape.

Another objective of the present invention is to provide a zigzag stacking device which can prevent a positive electrode plate from moving in a stacked electrode assembly by performing a sealing process together whenever the separator is stacked on the positive electrode plate in the stacking process.

The present invention provides a zigzag stacking device that alternately stacks a positive electrode plate and a negative electrode plate on a separator folded in a zigzag shape to compose an electrode assembly, the zigzag stacking device including a stack table on which the positive electrode plate, the separator, and the negative electrode plate are stacked and which is installed to be vertically movable, a swing roll provided above the stack table and configured to supply the separator in a zigzag shape to the stack table by left-right movement, a positive electrode unwinder configured to supply the positive electrode plate to a folded section of the separator folded in a zigzag shape, a negative electrode unwinder disposed opposite to the positive electrode unwinder and configured to alternately supply the negative electrode plate to an adjacent folded section adjacent to the folded section of the separator to which the positive electrode plate is supplied, a sealer installed above the swing roll to be vertically movable and configured to press and seal the separator on the stack table, and a controller configured to control operation of the stack table and the sealer, wherein the controller controls to perform sealing the separator whenever the separator is stacked on the positive electrode plate.

The stack table may be configured to generate heat.

The swing roll may be disposed biased toward one winder among the positive electrode unwinder and the negative electrode unwinder.

The controller may include a detection unit configured to detect whether the separator is stacked on the positive electrode plate, a first driving unit configured to drive the stack table and the sealer whenever the stacking of the separator is detected by the detection unit, and a second driving unit configured to seal an overlapping portion of the separator on a circumference of the positive electrode plate by the sealer.

Whenever the separator is stacked on the positive electrode plate on the stack table, the controller may be configured to raise the stack table, also lower the sealer, and press and seal the separator using the sealer.

After the sealer presses and seals the separator, the controller may be configured to lower the stack table, also raise the sealer, and sequentially and alternately stack the negative electrode plate and the positive electrode plate on the folded section of the sealed separator.

The sealer may include a heat emitting body protruding from a pressing surface for pressing the separator to generate heat, and a heat-resistant urethane sheet attached to the heat emitting body.

The sealer may have a bar shape, be provided as at least one sealer, and seal an overlapping portion of the separator on a circumference of the positive electrode plate.

The sealer may have a rectangular frame shape and seal an overlapping of the separator on a circumference of the positive electrode plate.

The sealer may have a rectangular parallelepiped shape and seal an overlapping portion of the separator on a circumference of the positive electrode plate.

According to the present invention, an electrode can be prevented from moving between separators during a stacking process for the electrode, which is performed in a zigzag shape.

Further, a sealing process performed after the stacking process is completed is performed together whenever the separator is stacked on a positive electrode plate, and thus the positive electrode plate can be prevented from slipping and moving in a stacked electrode assembly.

Further, the electrode is prevented from moving in the stacked electrode assembly from an initial time, and thus misalignment of the electrode plate in the electrode assembly can be prevented, and product quality can be improved.

DETAILED DESCRIPTION

Figure 1:
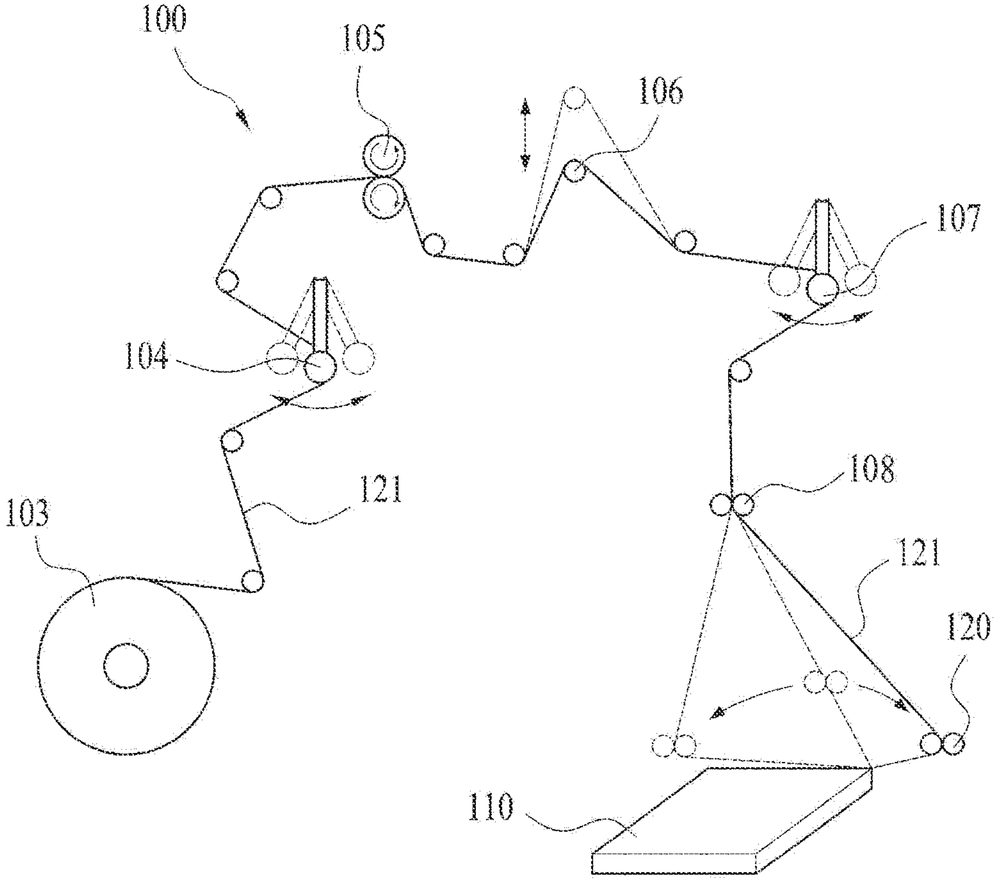
FIG. 1 (PRIOR ART)
FIG. 1 is a schematic diagram illustrating a zigzag stacking device according to the prior art.
Figure 2:
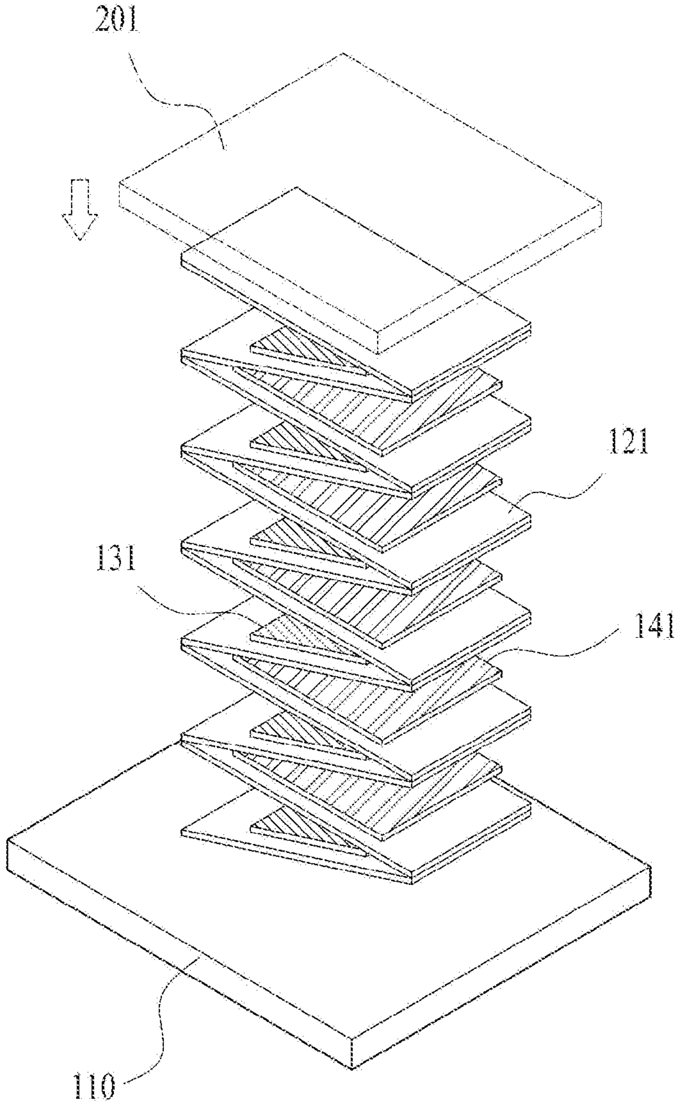
FIG. 2 (PRIOR ART)
FIG. 2 is a schematic perspective view illustrating an electrode assembly stacked through the zigzag stacking device according to the prior art.

The present invention provides A zigzag stacking device that stacks a positive electrode plate and a negative electrode plate on a separator folded in a zigzag shape to compose an electrode assembly, the zigzag stacking device including: a stack table on which the positive electrode plate, the separator, and the negative electrode plate are stacked and which is installed to be vertically movable; a swing roll provided above the stack table and configured to supply the separator in a zigzag shape to the stack table by left-right movement; a positive electrode unwinder configured to supply the positive electrode plate to a folded section of the separator folded in a zigzag shape; a negative electrode unwinder disposed opposite to the positive electrode unwinder and configured to alternately supply the negative electrode plate to an adjacent folded section adjacent to the folded section of the separator to which the positive electrode plate is supplied; a sealer installed above the swing roll to be vertically movable and configured to press and seal the separator on the stack table; and a controller configured to control operation of the stack table and the sealer, wherein the controller controls to perform sealing the separator whenever the separator is stacked on the positive electrode plate.

Hereinafter, the present invention will be described in detail. Prior to this, terms or words used in the present specification and the appended claims should not be interpreted as being limited to usual or dictionary meanings and should be interpreted as meanings and concepts corresponding to the technical spirit of the present invention according to the principle that the inventor may properly define the concepts of the terms in order to describe his/her own invention in the best way.

It should be understood throughout the specification of the present invention that terms such as “include” or “have” are intended to indicate that features, numbers, steps, operations, components, parts, or combinations thereof described in the specification are present and do not exclude in advance the possibility of the presence or addition of one or more other features, numbers, steps, operations, components, parts, or combinations thereof.

Further, when it is described that a first part such as a layer, a film, a region, and a plate is positioned “above” a second part, this includes not only a case in which the first part is “directly above” the second part but also a case in which a third part is present therebetween. In contrast, when it is described that a first part such as a layer, a film, a region, and a plate is positioned “below” a second part, this includes not only a case in which the first part is “directly below” the second part but also a case in which a third part is present therebetween. Further, in the specification of the present invention, a state in which a first part is disposed “above” a second part may include not only a state in which the first part is disposed above the second part but also a state in which the first part is disposed below the second part.

First Embodiment

Figure 3:
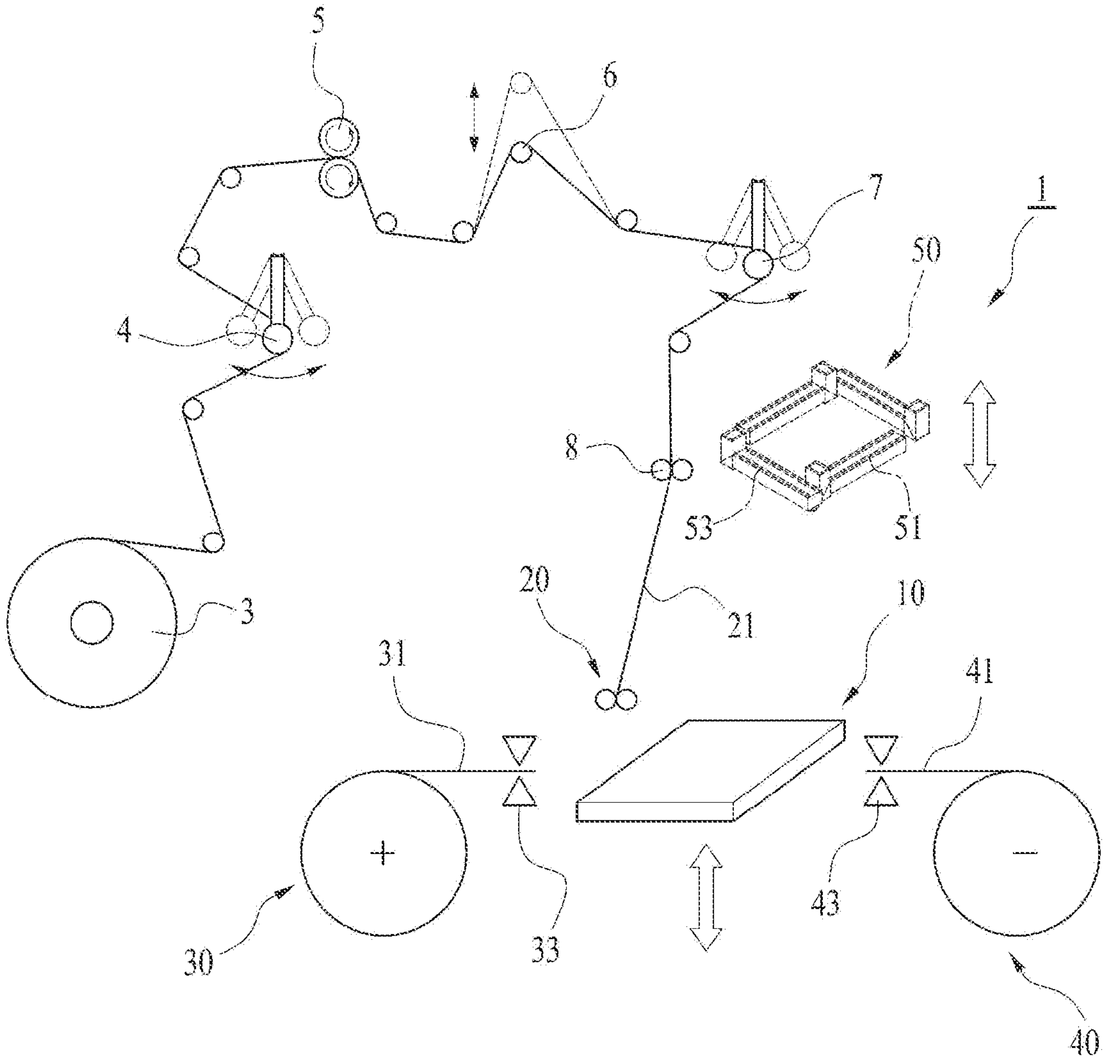
FIG. 3 is a schematic diagram illustrating a zigzag stacking device according to an embodiment.
Figure 4:
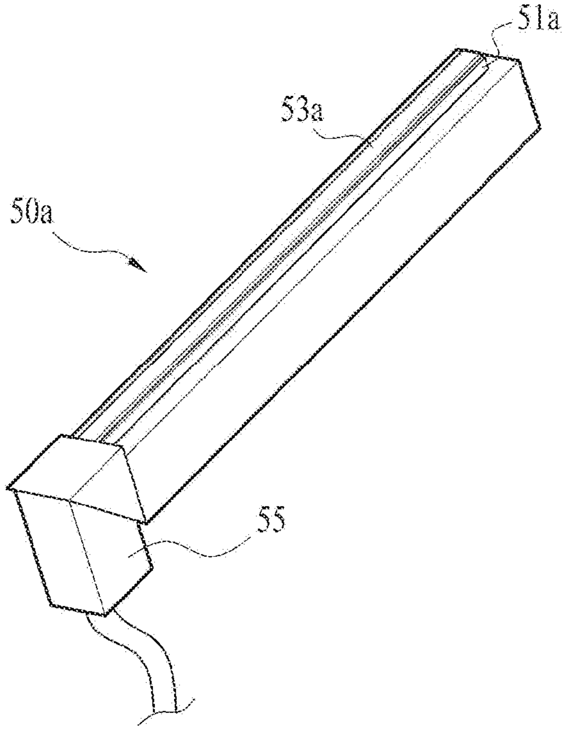
FIG. 4 is a schematic bottom perspective view illustrating a sealer of the zigzag stacking device of FIG. 3 according to another embodiment.
Figure 5:
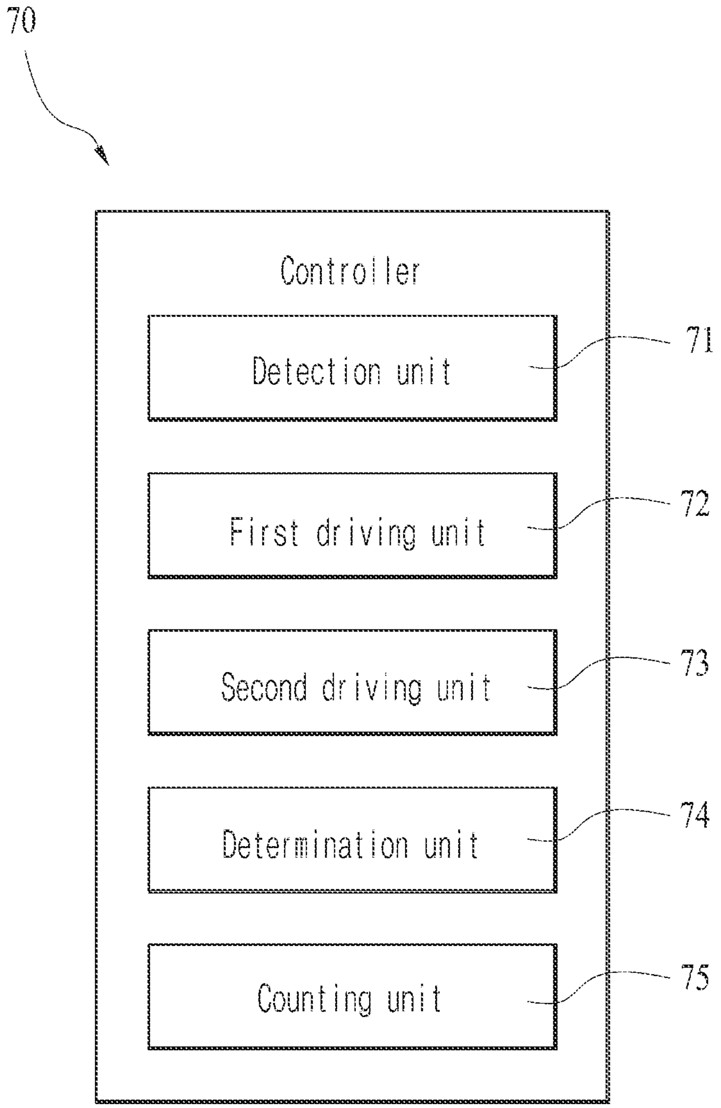
FIG. 5 is a schematic diagram illustrating a controller of the zigzag stacking device according to another embodiment.
Figure 6:
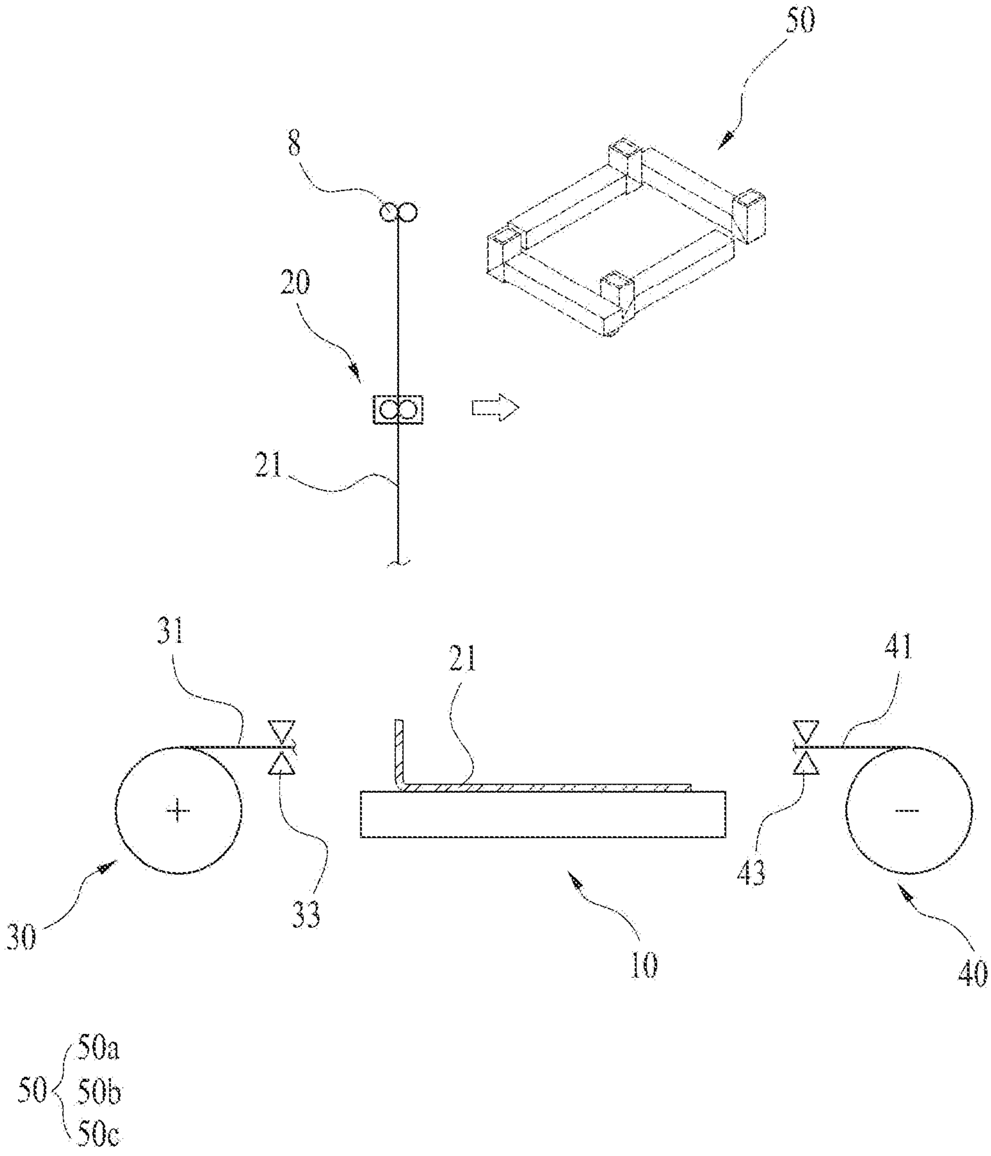
FIGS. 6 to 12 are schematic views illustrating a sealing process of sealing an electrode assembly by the sealer of the zigzag stacking device of FIG. 3 according to another embodiment.
Figure 7:
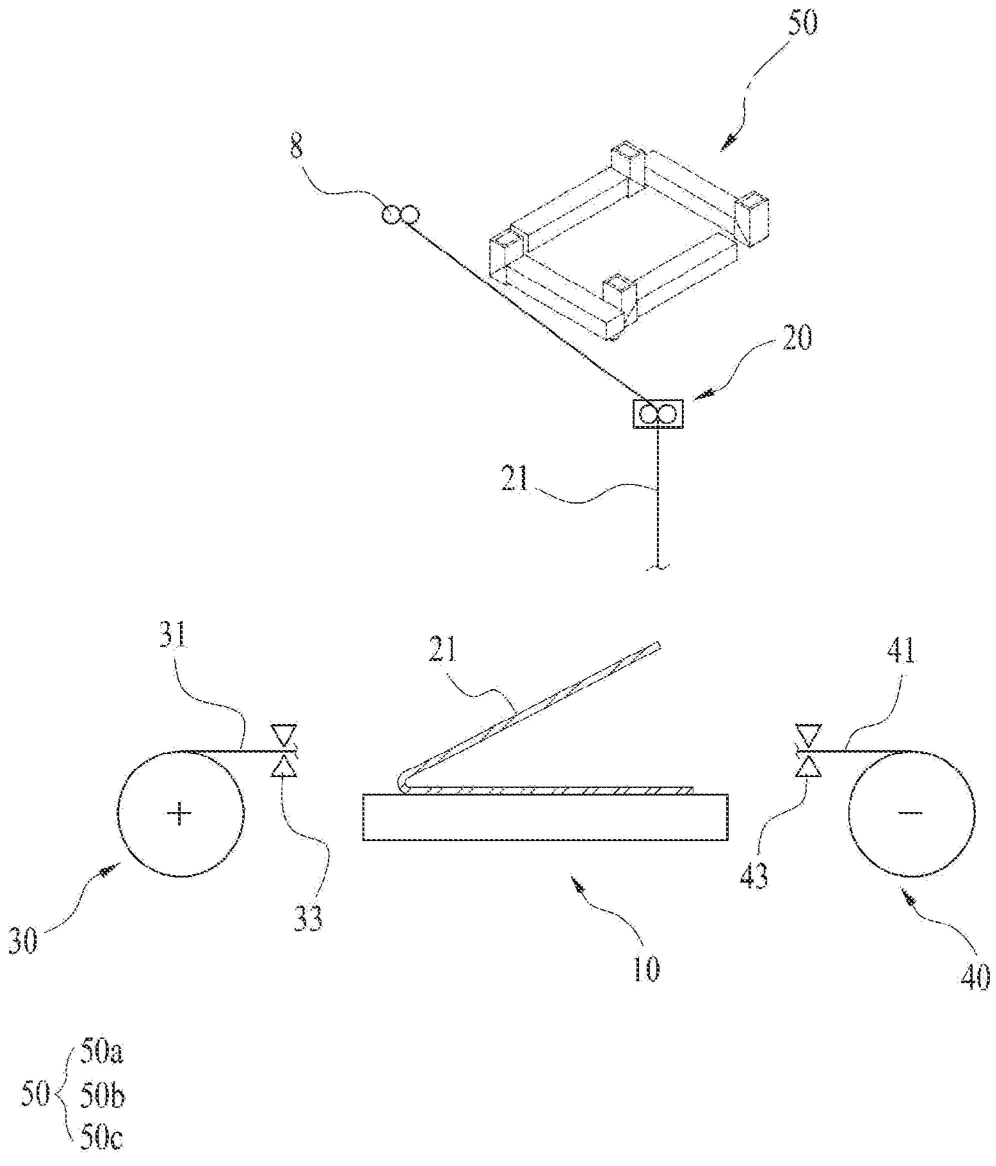
Figure 8:
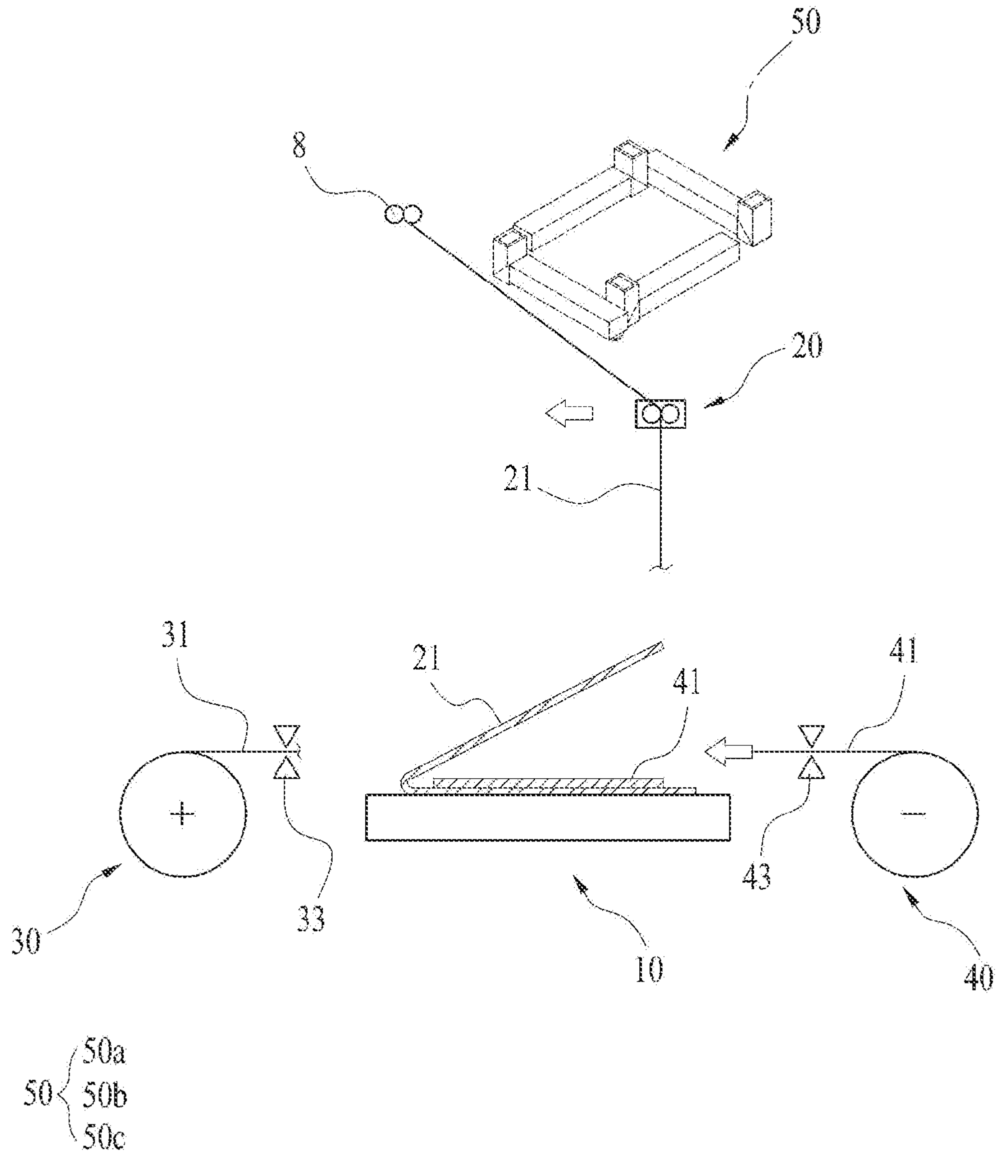
Figure 9:
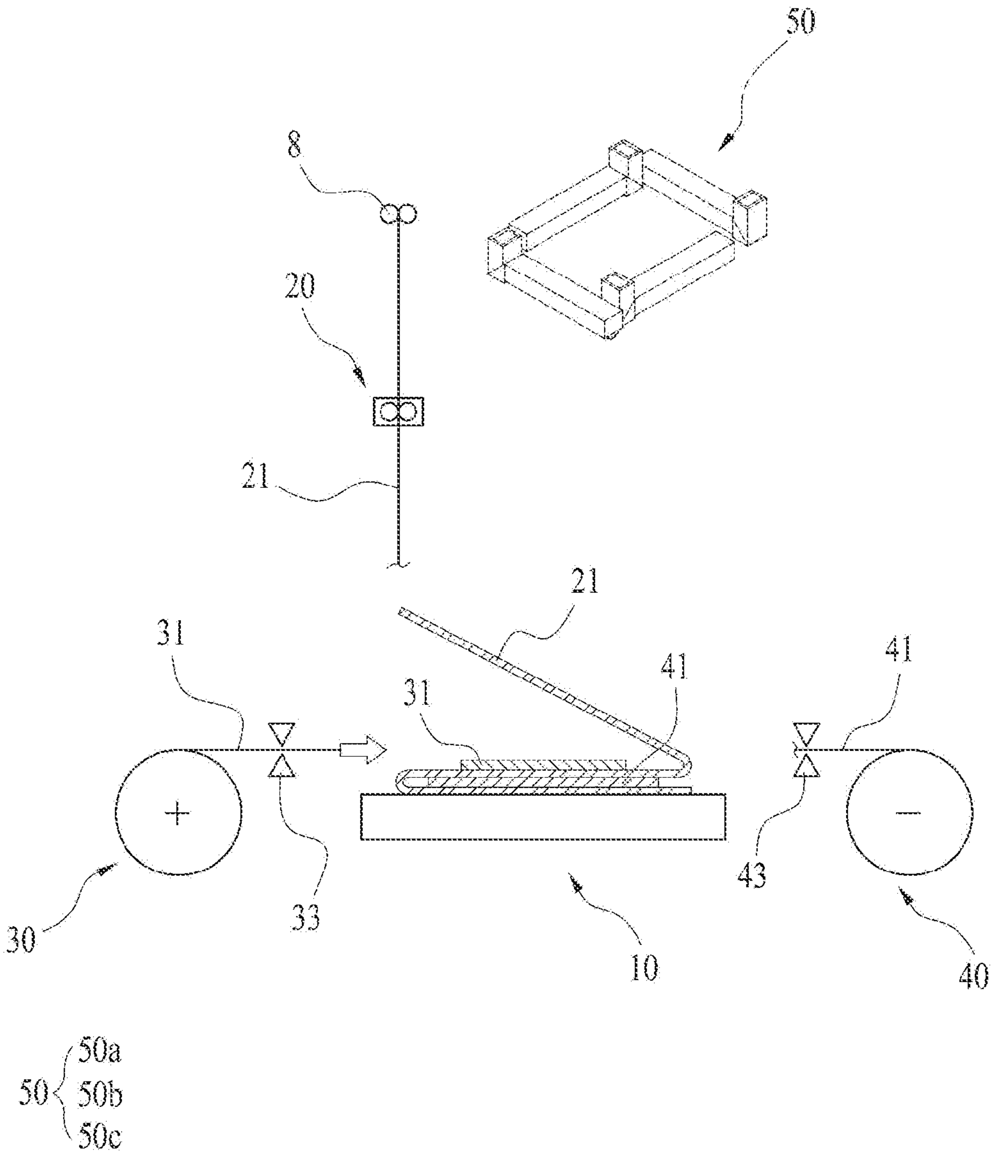
Figure 10:
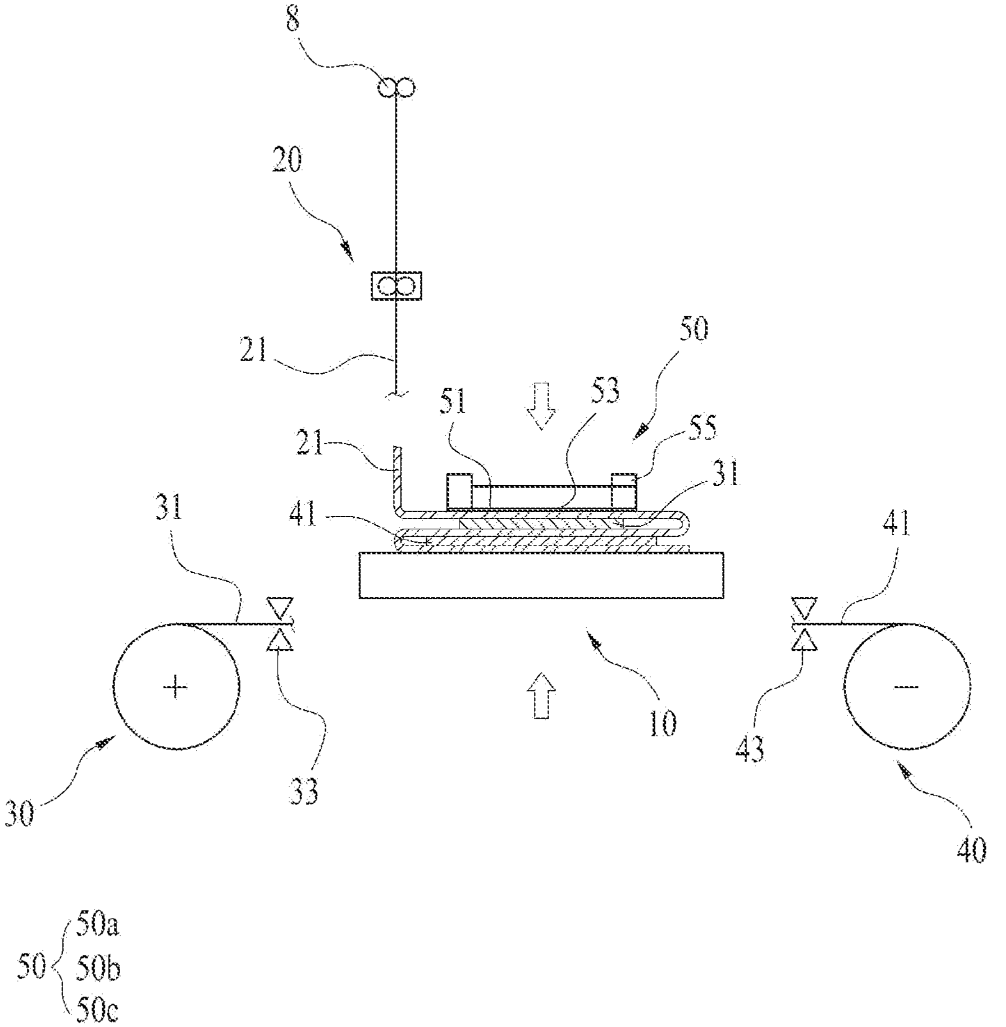
Figure 11:
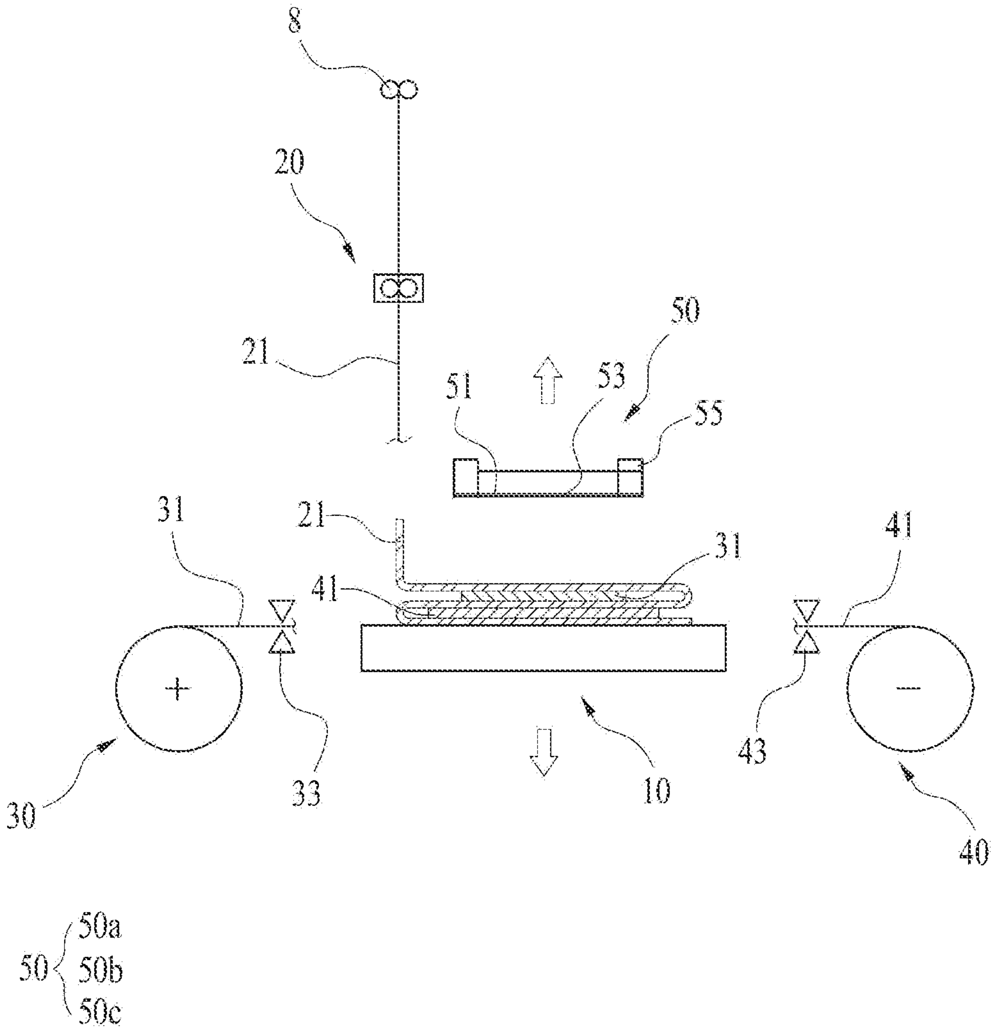
Figure 12:
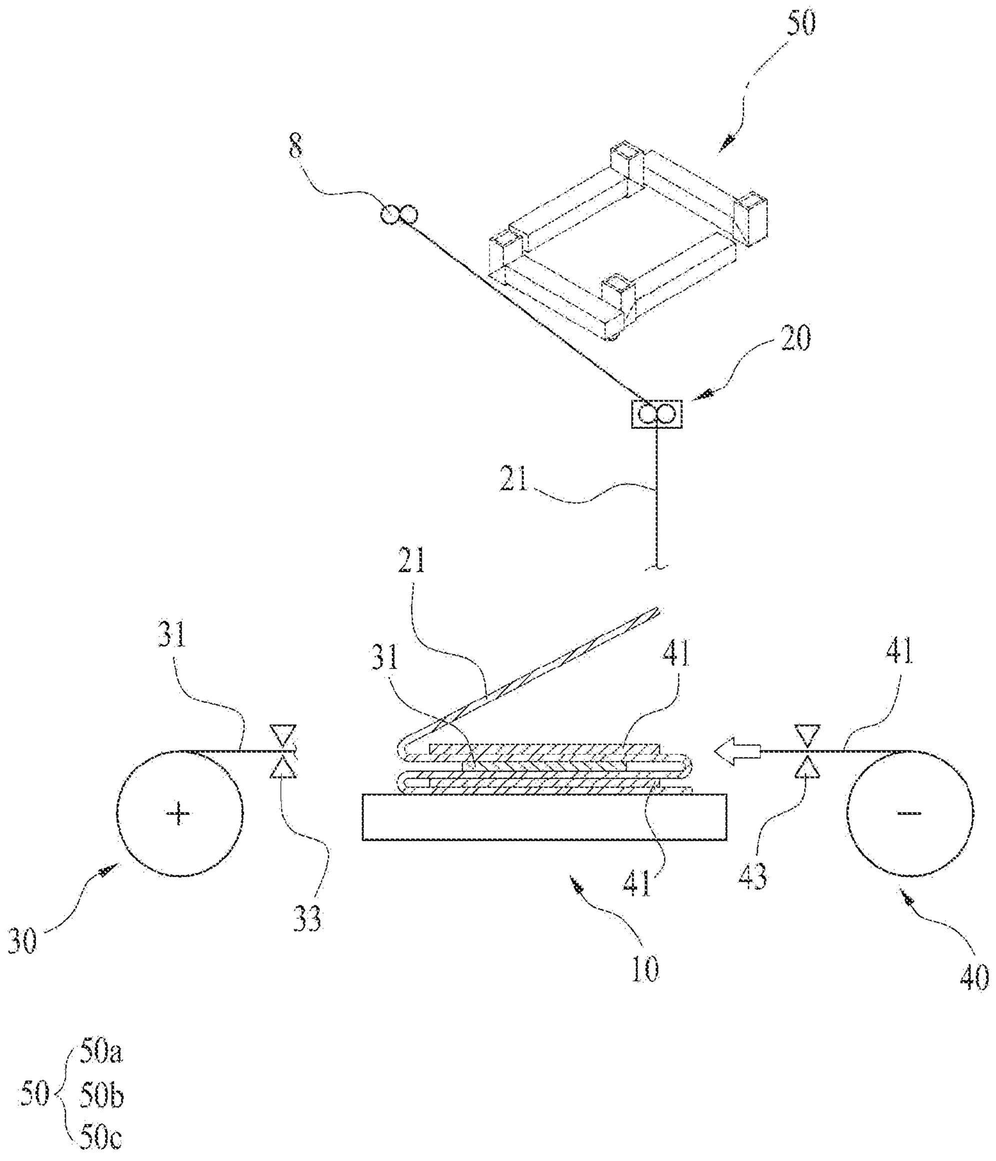

FIG. 3 is a schematic diagram illustrating a zigzag stacking device. FIG. 4 is a schematic bottom perspective view illustrating a sealer of the zigzag stacking device. FIG. 5 is a schematic diagram illustrating a controller of the zigzag stacking device. FIGS. 6 to 12 are schematic views illustrating a sealing process of sealing an electrode assembly by the sealer of the zigzag stacking device.

As illustrated in FIG. 3, in a zigzag stacking device 1 according to the present invention, a separator 21 is folded and stacked in a zigzag shape, and a positive electrode plate 31 and a negative electrode plate 41 are alternately stacked in a folded section of the separator 21 to compose an electrode assembly.

To this end, the zigzag stacking device 1 includes a stack table 10 on which the positive electrode plate 31, the negative electrode plate 41, and the separator 21 are stacked, a swing roll 20 provided above the stack table 10 and configured to supply the separator 21 to the stack table 10, a positive electrode unwinder 30 configured to supply the positive electrode plate 31 to the stack table 10, a negative electrode unwinder 40 configured to supply the negative electrode plate 41 to the stack table 10, a sealer 50 provided above the swing roll 20, and a controller 70 configured to control operation of the stack table 10 and the sealer 50, wherein the controller 70 seals the separator 21 whenever the separator 21 is stacked on the positive electrode plate 31.

Here, since movement of the stack table 10 and the sealer 50 may be implemented by a general linear movement mechanism, a detailed description of a movement structure will be omitted below.

In the stack table 10, the separator 21 is supplied onto an upper surface thereof in a zigzag shape and the positive electrode plate 31 and the negative electrode plate 41 are alternately stacked on a folded section of the separator 21 folded and supplied in a zigzag shape so as to compose the electrode assembly.

Here, the stack table 10 is formed of a plate body and is installed to be vertically movable.

Further, a heat emission member (not illustrated) is provided in the stack table 10 to generate heat at a predetermined temperature.

In this way, since the stack table 10 may generate heat, the separator 21 stacked on an upper surface of the stack table 10 is heated at a predetermined temperature to make an atmosphere in which the separators 21 can be bonded to each other without a separate adhesive.

The swing roll 20 is provided above the stack table 10 and supplies the separator 21 onto the stack table 10 in a zigzag shape by left-right reciprocating movement like a pendulum motion.

To this end, the swing roll 20 includes a pair of left and right rollers, and when the separator 21 is supplied onto the stack table 10 through a space between the pair of left and right rollers, the separator 21 is supplied into the stack table 10 in a zigzag shape by the left-right movement of the swing roll 20.

According to the above-described structure, the separator 21 wound around a separator unwinder 3 is supplied to the swing roll 20 through a first dancer roll 4 and a feeding roll 5, a buffer roll 6 and a second dancer roll 107, and a supply roll 107, and the separator 21 is supplied on a stack table 10 in a zigzag shape by the left-right movement of the swing roll 20.

The positive electrode unwinder 30 is provided adjacent to the stack table 10 and supplies the positive electrode plate 31 to the folded section of the separator 21 folded in a zigzag shape.

Here, the positive electrode unwinder 30 has a roll shape, the positive electrode plate 31 is wound on an outer circumference thereof, and the positive electrode unwinder 30 supplies the wound positive electrode plate 31 to the folded section of the separator 21 folded on the stack table 10 in a zigzag shape.

To this end, the positive electrode unwinder 30 may further include a pickup unit (not illustrated) that picks up the positive electrode plate 31 or a transfer unit (not illustrated) that interposes the picked-up positive electrode plate 31 in the folded section of the separator 21, and the positive electrode unwinder 30 includes a positive electrode cutter 33 configured to cut the positive electrode plate 31.

Here, since the pickup unit, the transfer unit, and the positive electrode cutter 33 are well-known components, detailed descriptions thereof will be omitted.

The negative electrode unwinder 40 supplies the negative electrode plate 41 to the folded section of the separator 21 folded in a zigzag shape.

Here, the negative electrode unwinder 40 is disposed opposite to the positive electrode unwinder 30 to alternately supply the negative electrode plate 41 to an adjacent folded section adjacent to the folded section of the separator 21 to which the positive electrode plate 31 is supplied.

According to the above-described structure, the positive electrode plate 31 is supplied and interposed through the positive unwinder 30 in the folded section of the separator 21 folded in a zigzag shape, and the negative electrode plate 41 is supplied and interposed through the negative electrode unwinder 40 in the adjacent folded section adjacent to the folded section of the separator 31 in which the positive electrode plate 31 is interposed. In this way, the positive electrode plate 31 and the negative electrode plate 41 may be sequentially and alternately supplied to the folded section of the separator 21 to manufacture the electrode assembly.

Even in this case, the negative electrode unwinder 40 may further include a pickup unit (not illustrated) that picks up the negative electrode plate 41 or a transfer unit (not illustrated) that interposes the picked-up negative electrode plate 41 in the folded section of the separator 21, and the negative electrode unwinder 40 includes a negative electrode cutter 43 configured to cut the negative electrode plate 41.

The sealer 50 is installed above the swing roll 20 to be vertically movable and presses and seals the separator 21 on the stack table 10.

Here, the sealer 50 includes a heat emitting body 51 protruding from a pressing surface pressing the separator 21 and configured to emit heat, and a heat-resistant urethane sheet 53 attached to the heat emitting body 51.

That is, in the sealer 50, the heat emitting body 51 protrudes from a lower surface thereof in contact with the separator 21, and the heat-resistant urethane sheet 53 is installed in the heat emitting body 51 to prevent the separator 21 from being damaged by heating and pressing of the heat emitting body 51.

Meanwhile, a Vulkollan sheet that exhibits stability even under harsh conditions such as a high temperature, a low temperature, and a high load and is excellent in abrasion resistance, durability, and oil resistance may be applied to the heat-resistant urethane sheet 53.

In this way, the heat emitting body 51 is provided on the pressing surface on which the sealer 50 presses the separator 21 while in contact with the separator 21, the separators 21 are bonded to each other by pressing and heating, and thus a separate adhesive for bonding the separator 21 is not required.

Meanwhile, the swing roll 20 may be disposed biased toward one unwinder of the positive electrode unwinder 30 and the negative electrode unwinder 40 above the stack table 10 in order to prevent interference between the sealer 50 that presses and seals the separator 21 while vertically moving from the upper side of the stack table 10 toward the stack table 10 and the swing roll 20 that is provided above the stack table 10 and supplies the separator 21 onto the stack table 10 in a zigzag shape by left-right movement.

According to the above-described structure, when the swing roll 20 supplies the separator 21 onto the stack table 10 in a zigzag shape while repeatedly moving in a left-right direction, the sealer 50 may be positioned above the swing roll 20 and be in standby, and when the swing roll 20 is positioned biased toward one unwinder of the positive electrode unwinder 30 and the negative electrode unwinder 40, the sealer 50 may move upward or downward onto the stack table 10.

Meanwhile, as in an embodiment illustrated in FIG. 4, a sealer 50*a* is formed in a bar shape, at least one sealer 50*a* is provided, and thus a portion of a circumference of the positive electrode plate 31, overlapping the separator 21, may be sealed.

As described above, since the sealer 50*a* has a bar shape, a heat emitting body 51*a* protrudes in a longitudinal direction from a lower surface that is a pressing surface for pressing the separator 21 and emits heat, and a heat-resistant urethane sheet 53*a* is installed even in the heat emitting body 51*a* in a longitudinal direction.

Further, a connection opening 55 in which a power cable (not illustrated) electrically connected to the heat emitting body 51*a* is inserted and installed is provided in the sealer 50*a*.

In this case, the heat-resistant urethane sheet 53*a* may be attached as one sheet to correspond to a length of the heat emitting body 51*a* or may be divided into a plurality of sheets having a certain length, which may be attached to the heat emitting body 51*a*.

Meanwhile, four sealers 50*a* may be arranged in a rectangular shape such that the sealers 50*a* press an overlapping portion of the separator 21 overlapping the positive electrode plate 31 along a circumference thereof at once, one or two sealers 50*a* may be arranged to seal the overlapping portion of the separator 21 overlapping the circumference of the positive electrode plate 31 while moving, and various other changes are possible.

The controller 70 configured to control operation of the stack table 10 and the sealer 50 and seals the separator 21 whenever the separator 21 is stacked on the positive electrode plate 31.

In general, since the positive electrode plate 31 is smaller than the negative electrode plate 41, when the positive electrode plate 31, the separator 21, and the negative electrode plate 41 are stacked to form the electrode assembly, a position of the positive electrode plate 31 may be changed, resulting in misalignment. Thus, in the present invention, to prevent the position of the positive electrode plate 31 from being changed when the separator 21 is stacked on the positive electrode plate 31, the overlapping portion of the separator 21 on the circumference of the positive electrode plate 31 is sealed whenever the separator 21 is stacked on the positive electrode plate 31.

Referring to FIG. 5, the controller 70 includes a detection unit 71, a first driving unit 72, and a second driving unit 73.

The detection unit 71 detects whether the separator 21 is stacked on the positive electrode plate 31. To this end, the positive unwinder 30 may be provided with a rotation detection sensor (not illustrated) for detecting rotation of the positive unwinder 30, and the swing roll 20 may be provided with a movement detection sensor (not illustrated) for detecting left-right movement of the swing roll 20.

When the stacking of the separator 21 on the positive electrode plate 31 is detected through the detection unit 71, whenever the separator 21 is stacked, the first driving unit 72 drives the stack table 10 to move the stack table 10 upward and also drives the sealer 50 to move the stack table 10 downward.

According to the above-described structure, when the detection unit 71 detects the rotation of the positive unwinder 30 through the rotation detection sensor and then detects the stacking of the separator 21 by the movement detection sensor, the first driving unit 72 drives the stack table 10 and the sealer 50.

Meanwhile, the controller 70 may further include a determination unit 74 for determining an order of a detection value detected by the rotation detection sensor and a detection value detected by the movement detection sensor.

Therefore, the stack table 10 and the sealer 50 are not driven when the separator 21 is stacked on the negative electrode plate 41, the stack table 10 and the sealer 50 are driven whenever the separator 21 is stacked on the positive electrode plate 31, and thus malfunction of the device can be prevented.

Further, the controller 70 may further include a counting unit 75 for counting the rotation of the positive electrode unwinder 30 and the movement of the swing roll 20.

Therefore, the electrode assembly can be manufactured such that the numbers of the positive electrode plates 31 and the negative electrode plates 41 of the electrode assembly on which the positive electrode plate 31, the separator 21, and the negative electrode plate 41 are stacked may be set to a predetermined number.

The second driving unit 73 seals the overlapping portion of the separator 21 on the circumference of the positive electrode plate 31 through the sealer 50.

That is, for the sealer 50 driven by the first driving unit 72 and pressing the separator 21, the second driving unit 73 drives the heat emitting body 51 of the sealer 50 to generate heat so as to seal the overlapping portion of the separator 21 on the circumference of the positive electrode plate 31.

In this way, the sealer 50 generates heat while pressing the separator 21 stacked on the positive electrode plate 31 so that the separator 21 on the positive electrode plate 31 and the separator 21 stacked under the positive electrode plate 31 are bonded to each other, and accordingly, the overlapping portion of the separator 21 overlapping the circumference of the positive electrode plate 31 is sealed.

Meanwhile, the sealer 50 may further include a contact detection sensor (not illustrated) or a pressing detection senor (not illustrated) for detecting contact with the separator 21, and movement of the sealer 50 pressing the separator 21 may be stopped by the contact detection sensor or the pressing detection sensor. Therefore, a pressing force for the separator 21 may be maintained constant or the pressing force for pressing the separator 21 may be allowed to be smaller than a set reference value.

According to the above-described structure, the controller 70 controls operation of the stack table 10 and the sealer 50 so that, whenever the separator 21 is stacked on the positive plate 31 on the stack table 10, the stack table 10 is raised and the sealer 50 is lowered, and the separator 21 is pressed and sealed by the sealer 50.

That is, after the positive electrode plate 31 is interposed in the folded section of the separator 21 supplied onto the stack table 10 in a zigzag shape, the controller 70 raises the stack table 10 and also lowers the sealer 50 whenever the separator 21 is stacked on the interposed positive electrode plate 31, and presses and seals the separator 21 using the lowered sealer 50.

Further, the controller 70 lowers the stack table 10 and also raises the sealer 50 after the separator 21 is pressed and sealed using the sealer 50, and sequentially and alternately stacks the negative electrode plate 41 and the positive electrode plate 31 on the adjacent folded section to the sealed separator 21.

That is, after pressing and sealing the separator 21 using the sealer 50, the controller 70 lowers the stack table 10 to an initial position and also raises the sealer 50 to an initial position.

Further, the swing roll 20 is moved in a left-right direction again to supply the separator 21 onto the stack table 10 in a zigzag shape, and the negative electrode plate 41 and the positive electrode plate 31 are sequentially and alternately stacked on a subsequent folded section of the sealed separator 21.

In an embodiment of the present invention, whenever the separator 21 is stacked on the positive electrode plate 31, the overlapping portion of the separator 21 on the circumference of the positive electrode plate 31 is repeatedly sealed. However, whenever the separator 21 is stacked on the positive electrode plate 31 and the negative electrode plate 41, the overlapping portion of the separator 21 on the circumference of the positive electrode plate 31 and the overlapping portion of the separator 21 on a circumference of the negative electrode plate 41 may be repeatedly sealed. The present invention is not limited thereto.

Hereinafter, an operation process of the zigzag stacking device according to an embodiment of the present invention will be briefly described with reference to FIGS. 6 to 12.

First, the separator 21 wound around the separator unwinder 3 is supplied to the swing roll 20 below the supply roll 8 through the first dancer roll 4 and the feeding roll 5, the buffer roll 6 and the second dancer roll 7, and the supply roll 8, and the separator 21 is supplied on the stack table 10 in a zigzag shape by left-right reciprocating movement of the swing roll 20.

Further, the negative electrode plate 41 wound around the negative electrode unwinder 40 is disposed above the separator 21 of the stack table 10, and the swing tool 20 moves to stack the separator 21 on the negative electrode plate 41 in a zigzag shape. Further, the positive electrode plate 31 is disposed above the separator 21 stacked in a zigzag shape, and the swing roll 20 moves to stack the separator 21 on the positive electrode plate 31 in a zigzag shape.

That is, the negative electrode plate 41 wound around the negative electrode unwinder 40 is supplied to the folded section of the separator 21 supplied onto the stack table 10 in a zigzag shape, and the positive electrode plate 31 wound around the positive electrode unwinder 30 is supplied to another folded section of the separator 21 supplied onto the stack table 10 in a zigzag shape.

In this case, after the positive electrode plate 31 and the negative electrode plate 41 having a certain length are supplied to the folded section of the separator 21, the positive electrode plate 31 and the negative electrode plate 41 are cut by the positive electrode cutter 33 and the negative electrode cutter 43.

In this way, when the separator 21 is stacked on the positive electrode plate 31, the stack table 10 moves upward toward the swing roll 20, and the sealer 50*a* moves downward toward the stack table 10 to press the separator 21.

Further, while a pressing surface of the sealer 50*a* presses the separator 21 stacked on the positive electrode plate 31 while in contact with the separator 21, the heat emitting body 51*a* provided on the pressing surface of the sealer 50*a* generates heat to seal the overlapping portion of the separator 21 on the circumference of the positive electrode plate 31.

In this case, the stack table 10 is heated in a temperature range of 70° C. to 90° C., the heat emitting body 51*a* of the sealer 50*a* is heated to a predetermined temperature, and thus the separators 21 stacked on and under the positive electrode plate 31 with respect to the circumference of the positive electrode plate 31 are sealed.

Meanwhile, after the separator 21 is pressed and sealed using the sealer 50*a*, the stack table 10 is lowered and the sealer 50*a* is also raised so that the stack table 10 and the sealer 50*a* return to the initial positions thereof, and the negative electrode plate 41 and the positive electrode plate 31 are sequentially and alternately stacked in the folded section of the separator 21 by the left-right movement of the swing roll 20 again. Thereafter, whenever the separator 21 is stacked on the positive electrode plate 31, the stack table 10 and the sealer 50*a* are moved to seal the overlapping portion of the separator 21 on the circumference of the positive electrode plate 31.

Second Embodiment

Figure 13:
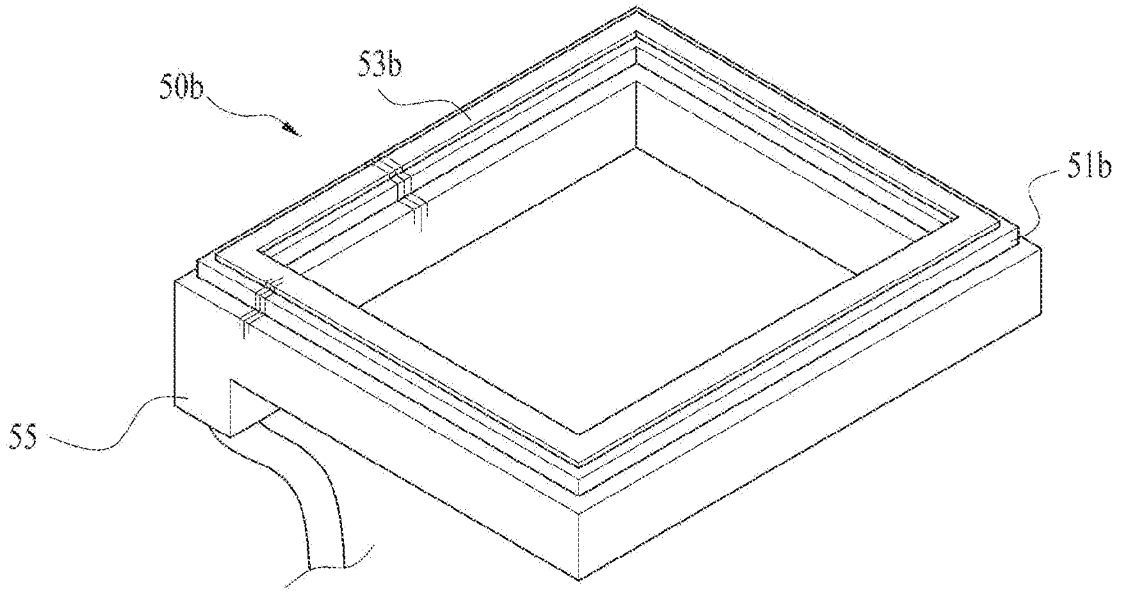
FIG. 13 is a schematic bottom perspective view illustrating a sealer of the zigzag stacking device of FIG. 3 according to another embodiment.

FIG. 13 is a schematic bottom perspective view illustrating a sealer of the zigzag stacking device according to another embodiment.

As illustrated in FIG. 13, a sealer 50*b* according to the present embodiment has a rectangular frame shape and seals the overlapping portion of the separator 21 on the circumference of the positive electrode plate 31.

As described above, since the sealer 50*b* has a hollow rectangular frame shape, the heat emitting body 51*b* having a rectangular frame shape protrudes even from a lower surface that is a pressing surface for pressing the separator 21 to generate heat, and a heat-resistant urethane sheet 53*b* having a rectangular frame shape is installed even in the heat emitting body 51*b*.

Even in this case, the connection opening 55 in which the power cable (not illustrated) electrically connected to the heat emitting body 51*b* is inserted and installed is provided in the sealer 50*b*.

Further, the heat-resistant urethane sheet 53*b* may be attached as one sheet to correspond to a length of the heat emitting body 51*b* or may be divided into a plurality of sheets having a certain length, which may be attached to the heat emitting body 51*b*.

In this way, since the sealer 50*b* has a rectangular frame shape, the overlapping portion of the separator 21 on the circumference of the positive electrode plate 31 can be collectively sealed by a single operation.

Third Embodiment

Figure 14:
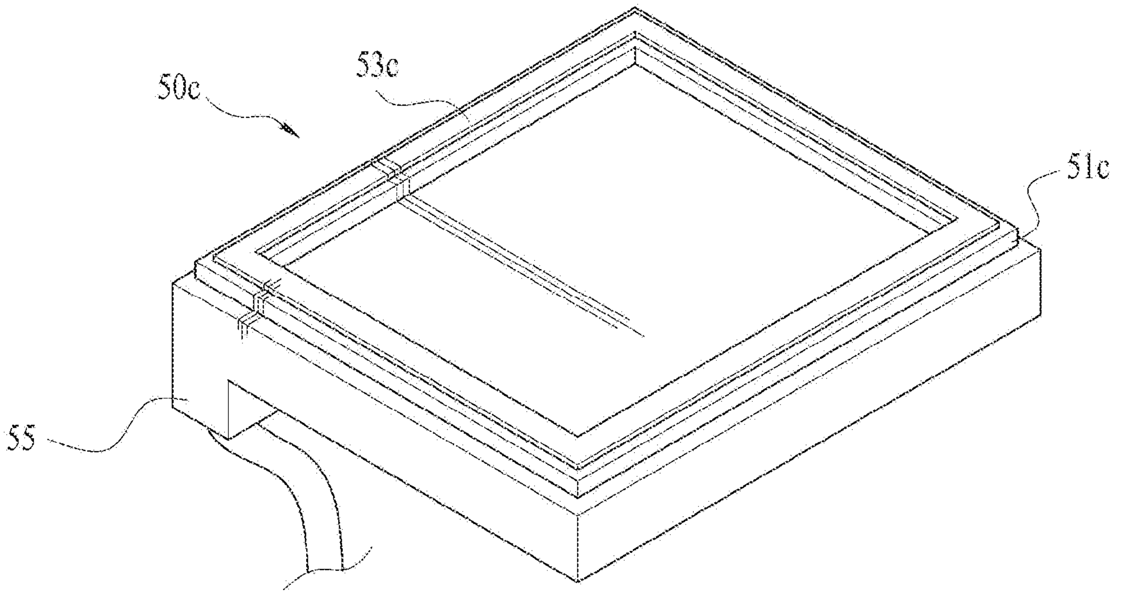
FIG. 14 is a schematic bottom perspective view illustrating a sealer of the zigzag stacking device of FIG. 3 according to still another embodiment.

FIG. 14 is a schematic bottom perspective view illustrating a sealer of the zigzag stacking device according to still another embodiment.

As illustrated in FIG. 14, a sealer 50*c* according to the present embodiment has a rectangular parallelepiped shape and seals the overlapping portion of the separator 21 on the circumference of the positive electrode plate 31.

As described above, since the sealer 50*c* has a rectangular parallelepiped shape of a plate body, the heat emitting body 51*c* having a rectangular frame shape protrudes from the lower surface that is the pressing surface for pressing the separator 21 to generate heat, and a heat-resistant urethane sheet 53*c* having a rectangular frame shape is installed in the heat emitting body 51*c*.

Even in this case, the connection opening 55 in which the power cable electrically connected to the heat emitting body 51*c* is inserted and installed is provided in the sealer 50*c*.

Further, the heat-resistant urethane sheet 53*c* may be attached as one sheet to correspond to a length of the heat emitting body 51*c* or may be divided into a plurality of sheets having a certain length, which may be attached to the heat emitting body 51*c*.

In this way, since the sealer 50*c* has a rectangular parallelepiped shape, the overlapping portion of the separator 21 on the circumference of the positive electrode plate 31 may be sealed by a single operation.

Hereinabove, the present invention has been illustrated and described in relation to specific embodiments, but those skilled in the art can easily understand that various modifications and changes are possible without departing from the spirit and scope of the invention described in the appended claims.

DESCRIPTION OF REFERENCE NUMERALS

1: Zigzag stacking device
3: Separator unwinder
4: First dancer roll
5: Feeding roll
6: Buffer roll
7: Second dancer roll
8: Supply roll
10: Stack table
20: Swing roll
21: Separator
30: Positive electrode unwinder
31: Positive electrode plate
33: Positive electrode cutter
40: Negative electrode unwinder
41: Negative electrode plate
43: Negative electrode cutter
50, 50*a*, 50*b*, 50*c*: Sealer
51, 51*a*, 51*b*, 51*c*: Heat emitting body
53, 53*a*, 53*b*, 53*c*: Urethane sheet
55: Connection opening
70: Controller
71: Detection unit
72: First driving unit
73: Second driving unit
74: Determination unit
75: Counting unit

The invention claimed is:

1. A zigzag stacking device that stacks a positive electrode plate and a negative electrode plate on a separator folded in a zigzag shape to compose an electrode assembly, the zigzag stacking device comprising:

a vertically movable stack table on which the positive electrode plate, the separator, and the negative electrode plate are stacked;

a swing roll located above the vertically movable stack table and configured to supply the separator in a zigzag shape to the vertically movable stack table by horizontal movement;

a positive electrode unwinder configured to supply the positive electrode plate to a folded section of the separator folded in a zigzag shape;

a negative electrode unwinder disposed opposite to the positive electrode unwinder and configured to alternately supply the negative electrode plate to an adjacent folded section adjacent to the folded section of the separator to which the positive electrode plate is supplied;

a vertically movable sealer located above the swing roll and configured to press and to seal the separator when the separator is on the vertically movable stack table; and a controller configured to control operations of the vertically movable stack table and the vertically movable sealer to perform sealing of the separator whenever the separator is stacked on the positive electrode plate and over the vertically movable stack table.

2. The zigzag stacking device of claim 1, further comprising a heat emission member located in the vertically movable stack table and configured to generate heat at a predetermined temperature.

3. The zigzag stacking device of claim 1, wherein the swing roll is disposed biased to at least one of the positive electrode unwinder and the negative electrode unwinder.

4. The zigzag stacking device of claim 1, wherein the controller includes a detection unit configured to detect whether the separator is stacked on the positive electrode plate, a first driving unit configured to drive the vertically movable stack table and the vertically movable sealer whenever the stacking of the separator is detected by the detection unit, and a second driving unit configured to seal an overlapping portion of the separator onto a circumference of the positive electrode plate by the sealer.

5. The zigzag stacking device of claim 4, wherein the controller further includes a counting unit configured for counting the rotation of the positive electrode unwinder.

6. The zigzag stacking device of claim 4, wherein, whenever the separator is stacked on the positive electrode plate and over the vertically movable stack table, the controller is configured to further control operations of the vertically movable stack table and the vertically movable sealer to cause the vertically movable stack table to be raised, the vertically movable sealer to be lowered, and the vertically movable sealer to press and seal the separator.

7. The zigzag stacking device of claim 6, wherein, after the vertically movable sealer presses and seals the separator, the controller is configured to further control operations of the vertically movable stack table and the vertically movable sealer to cause the vertically movable stack table to be lowered, the vertically movable sealer to be raised, and the negative electrode plate and the positive electrode plate to be sequentially and alternately stacked on the folded section of the sealed separator.

8. The zigzag stacking device of claim 1, wherein the vertically movable sealer includes a heat emitting body and a heat-resistant urethane sheet, wherein the heat emitting body protrudes from a pressing surface of the vertically movable sealer for pressing the separator and is configured to generate heat, and wherein the heat-resistant urethane sheet is attached to the heat emitting body.

9. The zigzag stacking device of claim 1, wherein the vertically movable sealer has a bar shape, is provided as at least one sealer, and is configured to seal an overlapping portion of the separator onto a circumference of the positive electrode plate.

10. The zigzag stacking device of claim 1, wherein the vertically movable sealer has a rectangular frame shape and is configured to seal an overlapping portion of the separator onto a circumference of the positive electrode plate.

11. The zigzag stacking device of claim 1, wherein the s vertically movable ealer has a rectangular parallelepiped shape and is configured to seal an overlapping portion of the separator onto a circumference of the positive electrode plate.

12. The zigzag stacking device of claim 5, wherein the counting unit is further configured for counting the rotation of the movement of the swing roll.

* * * * *